(12) United States Patent
Morse

(10) Patent No.: US 7,228,812 B2
(45) Date of Patent: Jun. 12, 2007

(54) SEA-BASED HYDROGEN-OXYGEN GENERATION SYSTEM

(76) Inventor: Arthur Morse, 215 Musket Cir., Lansdale, PA (US) 19446

( * ) Notice: Subject to any disclaimer, the term of this patent is extended or adjusted under 35 U.S.C. 154(b) by 0 days.

(21) Appl. No.: 11/105,980

(22) Filed: Apr. 14, 2005

(65) Prior Publication Data

US 2006/0162642 A1    Jul. 27, 2006

Related U.S. Application Data

(63) Continuation-in-part of application No. 10/709,744, filed on May 26, 2004, now Pat. No. 6,918,350.

(51) Int. Cl.
*B63B 38/00* (2006.01)
*F03B 13/10* (2006.01)
(52) U.S. Cl. ........................................ 114/382; 290/53
(58) Field of Classification Search ................ 114/382; 290/42, 43, 53, 54
See application file for complete search history.

(56) References Cited

U.S. PATENT DOCUMENTS

| 3,754,147 A | * | 8/1973 | Hancock et al. | ............... 290/53 |
| 4,172,689 A | * | 10/1979 | Thorsheim | ..................... 415/7 |
| 4,850,190 A | * | 7/1989 | Pitts | ............................. 60/398 |
| 6,864,596 B2 | * | 3/2005 | Maiwald et al. | ............... 290/54 |

FOREIGN PATENT DOCUMENTS

GB    2383978 A    *    7/2003

* cited by examiner

*Primary Examiner*—Jesús D. Sotelo
(74) *Attorney, Agent, or Firm*—Mark P. White

(57) ABSTRACT

A method for generation of gasses contained in a salt solution in accomplished by disposing automated, floating wave power collection vessels in waters distant from shore, the vessels navigating within one or more predetermined geographic zones, having suitable wave conditions for such operation. The wave power devices generating electricity and the gasses are extracted from the salt solution by electrolysis. Automated storage vessels are used as shuttles to deliver the gasses to shore facilities.

13 Claims, 16 Drawing Sheets

SEA-BASED HYDROGEN-OXYGEN GENERATION SYSTEM

PROSECUTION HISTORY

This application is a continuation in part of U.S. application Ser. No. 10/709,744 filed on May 26, 2004 now U.S. Pat. No. 6,918,350.

BACKGROUND OF THE INVENTION

The present invention is a system and method for using wave and wind power for the generation of hydrogen and oxygen. In its simplest form the wind is used to rotate a wind turbine, which is attached to an electric generator, and the waves are used to rotate the blades of an impeller driven by the water pressure created by waves. The electricity produced by the generator is then used to power an electrolysis subsystem, which produces hydrogen and oxygen from the water in the electrolysis salt bath.

The novelty in the present system arises from the fact that both the wind turbines and the wave power generators are located on collection vessels at sea, configured for this purpose. The vessels can be disposed out of the sight of land, which avoids the political problems attendant to the location of wind farms in proximity to residential areas. Furthermore, the collection vessels may be moved to the areas having the optimal wind and sea conditions for the generation of these gasses.

In a sense, the present system is a method of extracting and storing energy from the wind and waves for future use. It has been noted, for example, that the use of hydrogen as a fuel for automobiles requires that energy be expended to produce the hydrogen before it is released to propel an automobile. Storing the energy in the form of compressed gasses is an alternative to the traditional storage methods, such as electric batteries.

In the case of wind power generation systems, the present invention utilizes variable speed, high torque wind turbines that maximize power output per capital dollar expended on the system. Further, the land costs of traditional wind farms are eliminated, together with the location limitations and political issues associated with both wave power and wind turbine sites.

This invention includes a storage, transfer and distribution system that utilizes state-of-the art communication and control sub-systems, thereby minimizing operational labor costs.

The sea west or east of the continental United States, contains the best wind quality for wind turbine applications, and is far superior to most of the land sites available. Furthermore, it is well known that wind and wave conditions are related, so that areas of favorable wind speed and constancy also produce waves favorable for use in the current application. Due to the curvature of the earth, sites located 20 to 25 miles from land are not visible and, therefore, political opposition to the use of such sites is greatly reduced.

There are many ocean sites currently employing wind turbine technology to generate electricity. Denmark, for instance, has very aggressive plans to convert most of its energy generation to wind-based systems within the next ten years. In the United States, locations in Nantucket Sound, off Cape Cod, Mass., are being considered as sites for wind farms.

These sites, however, are connected directly to local power grids, as opposed to the storage of power in the forms of the present invention. Furthermore, most of these pior-art systems are on the land or close to land and are, therefore, impacted by land effect conditions which make energy generation much more costly than generation at sea. The sea-based prior wind-based prior art systems are generally anchored directly onto the ocean bottom and, therefore, must be located in areas of shallow ocean depths.

To overcome these restrictions, the present method provides for wind generation systems at sea which are free floating. Thus, with the present approach there are far fewer site limitations, no land costs, and limited potential political opposition.

Wave power technology is also being developed on both coastal locations, such as the Limpit system in Scotland, described in Appendix A, and on board sea-going vessels, such as the Japanese Mighty Whale as described in Appendix B. The land-based wave power systems must be located at the margins of large bodies of water, however, and furthermore the shore requirements are rather stringent, so that only a minority of these shore locations are practical at all, even before considering possible political objections.

Sea-based wave power generation systems are now being tried in various parts of the world. But the problem of storage and transmission of the power generated by these sea-based systems remains, for the most part, unsolved in any practical way. The present invention deals with the energy storage problem by using the power of wind and waves to produce hydrogen and oxygen, which become, in effect, storage media. Hydrogen in particular has been suggested as a replacement energy source for use in motor vehicles, and the present invention may provide a means for producing hydrogen in the quantities required for fueling hydrogen-powered motor vehicles.

The invention described herein addresses the problems of generation of power, storage of power, and transmission of power in a way that overcomes the major political problems associated with both wind and wave-generated power. It also solves the problem of energy storage associated with sea-based power generation.

The following description discloses and claims a system to cost-effectively generate hydrogen and oxygen gas by using wind and waves as alternative energy source. The application further describes how the floating sites at sea are configured and managed to provide the most cost effective method for these technologies.

SUMMARY OF INVENTION

It is the object of this invention to provide a method for the generation and storage of oxygen and hydrogen from the power of the wind and waves.

It is a further object of this invention to minimize the objections of such a generation system arising from political and environmental concerns.

In accordance with a first aspect of the invention, a method for generation of gasses contained in a salt solution includes the steps of disposing one or more collection vessels, each containing a wave power generation device, in waters distant from a proximate shore. Each collection vessel contains an electrical generator coupled to each of the wave power devices, the resulting electric current generating gasses from a salt solution by means of electrolysis.

In accordance with a second aspect of the invention, the vessels are located in predetermined geographic zones having a suitable sea conditions for such wave power generation. The zones are further located outside of established shipping lanes.

In accordance with a third aspect of the invention, communications between the collection vessels within the zone and a command center are provided.

In accordance with a fourth aspect of the invention one or more storage vessels are located within each predetermined zone for periodic transport of said gasses.

In accordance with a fifth aspect of the invention the collection vessels and storage vessels are controlled by remote control.

In accordance with a sixth aspect of the invention each collection vessel has an entrance below a vessel waterline at the bow so that waves approaching the bow enter the channel and rise above the waterline as the waves advance from the bow to the stern.

In accordance with a seventh aspect of the invention each collection vessel has a valve wall affixed in proximity to the stern end of the tapered channel, the valve wall further containing a multiplicity of check valves disposed across said valve wall, each of which permits the water breaking on the valve wall to enter a collection chamber, but prevents the water from the collection chamber from exiting.

In accordance with an eighth aspect of the invention each collection vessels includes a water turbine disposed beneath the collection chamber which rotates as the water from the collection chamber exits to the sea.

In accordance with a ninth aspect of the invention each collection vessel also contains an electric generator which is coupled to the water turbine.

In accordance with a tenth aspect of the invention a sea based central transfer station is used for collecting the gasses.

In accordance with an eleventh aspect of the invention the gasses are pipelined from the sea based central transfer station into a shore storage and purification facility.

In accordance with a twelfth aspect of the invention means are provided for the remote-controlled docking of any two or more of the vessels at sea, in order to transfer the gasses between the vessels.

In accordance with a thirteenth aspect of the invention one or more of the collection vessels disposes a sea anchor in order to reduce the drift of the vessel and to maintain the vessel with its stern facing into the wind.

In accordance with a fourteenth aspect of the invention a multiplicity of cables are disposed for maintaining the sea anchor in an anchoring position, and one or more retraction cables are further disposed for retracting the sea anchor.

In accordance with a fifteenth aspect of the invention each sea anchor is retracted into a storage tube when not used, and is extracted from the storage tube into disposed mode when in use.

In accordance with a sixteenth aspect of the invention, oxygen and hydrogen are produced by this method.

BRIEF DESCRIPTION OF DRAWINGS

These, and further features of the invention, may be better understood with reference to the accompanying specification and drawings depicting the preferred embodiment, in which.

DETAILED DESCRIPTION

Figure 1:
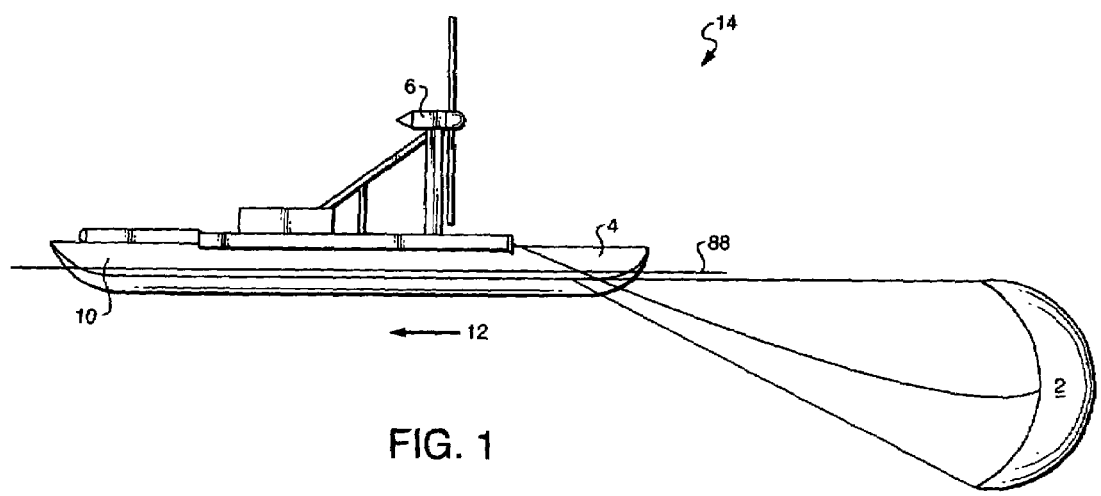
FIG. 1 depicts a wind-based power collection vessel in collection mode, with sea anchor set.

The present system utilizes a number of collection vessels each of which has on-board wind or wave power devices to convert the energy contained in the wind and waves to an electrical current which is then used to create hydrogen and oxygen from water by means of electrolysis. The collection vessels are of two distinct types: the wind-based collection vessels use the power of the wind to turn a wind turbine, which is coupled to an electric generator; the wave-based collection system uses the energy stored in waves to perform the same function.

The present wind-based collection system utilizes $19^{th}$ century technology, using a turbine with many blades on a single turbine rotor. In this way it maximizes the amount of blade surface area exposed to the wind to create increased torque, which, in turn, increases the output of the generator used for electrolysis. Any combination of voltage and current will cause the electrolysis process to work. Therefore, the main area of concern is to create as much torque as possible to drive the system. The revolutions per minute of the rotor are automatically controlled by the present invention in order to maximize power output under both normal and low wind conditions, and to minimize the stresses on the system in high wind conditions.

Like the use of the wind turbine, using the energy stored in water as a source of power is a very old technology. The novel approach in the present invention bears a distinct resemblance to the water wheel, or mill wheel. In both cases the water first must achieve a potential energy due to its elevation above the rotating device used to extract the energy. As the water descends, the potential energy is converted into kinetic energy as the wheel is made to rotate. In the present invention this rotation is then coupled to an electric generator, which generates a current as it rotates.

In the wind-based systems the revolutions per minute of the rotor are controlled in the present invention by gearing, in order to maximize power output regardless of wind speed. In the wave-based system the velocity of the water flowing past the water turbine is regulated, minimizing the stresses on the system under very high wave conditions.

The system has three key operational modes:

1. Power Conversion:

In this mode the wind turbines are generating power from the wind, and the water turbines are generating power from the waves. In both cases the electricity resulting is used to create hydrogen and oxygen by electrolysis of water.

The collection vessels in both systems utilize an oversized Sea Anchor to provide resistance against the wind when the system is collecting and converting wind and wave energy into hydrogen and oxygen. Sea Anchors are not directly connected to the ocean bottom. Rather, they are a hydraulic version of a parachute that resists drift instead of stopping it. Sea Anchors are well known in the prior art, and are standard for use in lifeboats, since they keep the lifeboat pointed into the wind and greatly slow drifting.

Wind and wave-based power collection vessels utilizing sea anchors during operation would slowly drift in the direction of the wind. The rate of drift depends upon the wind speed and sea conditions.

There is a close correspondence between wind speed and sea height. Rear-Admiral, Sir Francis Beaufort, of the Royal Navy, devised the original Beaufort scale on or about 1805, and it has become a standard still used today. A uniform set of equivalents of Beaufort numbers, wind speed, and sea height was accepted in 1926 and revised slightly in 1946. In 1955 the World Meteorological Organization established a correspondence between Beaufort Number, wind speed, and wave height. For instance, at Beaufort No. 3 the winds are between 7–10 kts, scattered whitecaps appear, and the seas are 2–3 ft. in height. At Beaufort 5 the wind velocity is 17–21 kts., some spray appears, and the wave height is 6–8 ft.

It is well understood and accepted that other factors can cause the height of the waves to depart from the "Beaufort" height at any particular wind speed. For instance, after a storm high waves may appear especially near the shore, even in the absence of wind. Also, bottom conditions may cause wave heights to vary widely from the numbers established by Beaufort.

However, on the high seas, under normal conditions, there will be a reasonably close correspondence between the wind speed and the height of the waves, in accordance with the standards published by the World Meteorological Organization.

Thus, conditions which favor generation of power by the wind turbines also favor use of the wave-generation systems. Thus, it is not unreasonable to include collection vessels of both the wind-power and wave-power together in a flotilla of collection vessels.

The hydrogen and oxygen generated by the collection vessels are temporarily stored in the "bottles" of the type commonly used for storage of these gasses. The bottles will later be transferred to storage vessels, distinctly designed vessels held in tow by the collection vessels to provides temporary additional storage for the gasses.

2. Navigation:

The present invention utilizes a predetermined zone of operation for the collection vessels. Despite attempts to keep the collection vessels from drifting, they eventually do move away from their desired collection location, where the wind and waves are optimum for the generation of the gasses. Repositioning of the collection vessels back to desired locations and transfer points for the collected gasses is needed.

Each collection vessel is free floating. An onboard navigation and communication system is required for each collection vessel in order to provide continual feedback to a shore based control center that monitors location and controls navigation of the collection vessel. Global positioning and radar communication is utilized for this purpose.

On-board propulsion and steering capability for each collection vessel is essential. In the present invention a propulsion drive system utilizing an internal combustion drive system fueled by the hydrogen and oxygen collected by the collection vessel is used.

Thus, the only fuel cost associated with repositioning is the diminution of the gasses produced during collection. However, the frequency and time to reposition is managed to minimize the amount of the gasses needed to fuel the propulsion of the vessels when repositioning them throughout the year.

Increasing the speed of repositioning by retracting the sea anchor and turbine blades, and increasing the horsepower of the main propulsion system thereby, will minimize the costs of repositioning.

3. Product Transfer:

The gasses produced by the collection operation must be transported to one or more distribution points, for transport to end-users. This normally requires transport of the containers of gasses collected to distribution points on the land. Transfer operations will utilize both modern communication technologies and robotics.

A docking, connecting a collection vessel to a secondary fuel storage vessel, would be controlled through GPS, remote controls using vision feedback systems and onboard PLC (Programmable Logic Controller) controls. Docking is also provided between the collection vessels and other stationary locations at sea.

The storage vessel, filled with gasses after transfer, would then detach from the collection vessel and then remotely navigate to a stationary fuel transfer facility at sea. This facility should be located near shore, so that the gasses can be pipelined to an onshore storage facility. Meanwhile another, empty secondary storage vessel will quickly replace the previous one, and rendezvous and dock with the collection vessel, thereby minimizing the downtime in the collection process.

Each storage vessel has an onboard propulsion system that will use Hydrogen as a fuel to transport the vessel to a central off-loading station near the shoreline. The vessel's progress is monitored by GPS positioning. Onboard cameras and radar provide information used by the automatic navigation system.

Once gasses are transferred from the storage vessel to the product transfer facility, the now-empty secondary storage vessel would return to stand by near the collection vessel sailing areas until needed to replace another storage vessel.

Referring first to FIG. 1, the wind-based collection vessel illustrated possesses the features discussed; the vessel also contains a propulsion system that is located near the bow 4. The propulsion system may be a standard internal combustion engine or modified gas/steam turbine. However, instead of gasoline or diesel power, hydrogen and oxygen fuel the engine.

Because the wind vessel faces the wind 14, it travels backward 12 while not under sail or power. The vessel is a "double-ender", with bow 4 and stern 10 having identical shapes. The bow faces wave activity during production operations and the stern and bow may experience waves while the vessel is under way.

FIG. 1 shows a sea anchor 2 disposed in front of the bow. The sea anchor is in the shape of a "parachute", and has the same function: it slows the speed of the vessel by creating a drag when the vessel moves in the direction of the wind 14, which is also the direction of drift 12 of the vessel.

Figure 3:
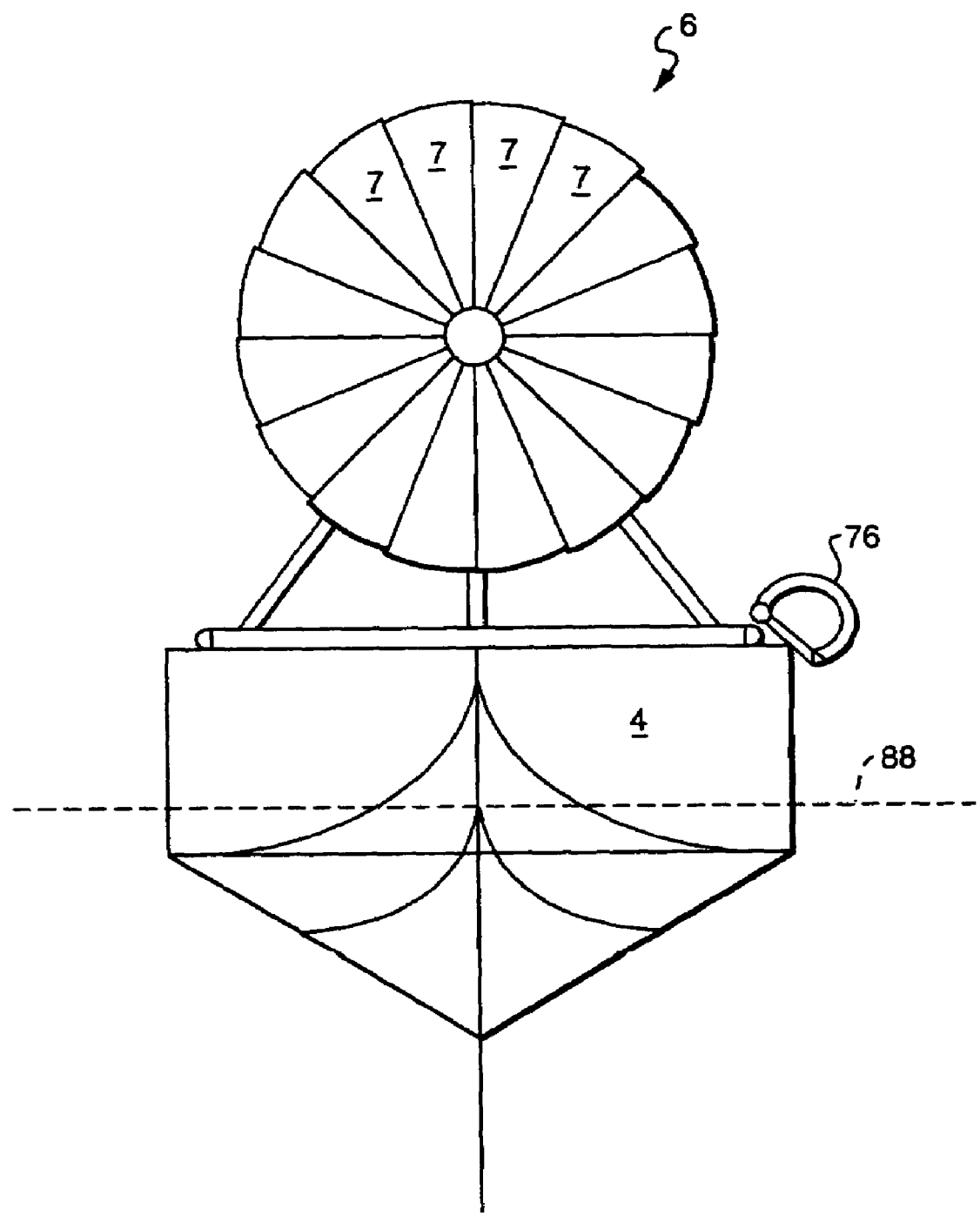
FIG. 3 depicts a front elevation view of the wind-based collection vessel.

A monohull design as displayed in FIG. 3 is expected to be the most stable platform for this kind of application. However, other types of hulls would work. For example, obsolete naval vessels are often auctioned off by the US government and could be converted to support wind systems.

Controlling Turbine Speeds vs. Power Output:

The current output is dependent upon the available voltage supplied by the generator and the resistance to current flow within the entire electrical circuit. As resistance is reduced more current can flow with any given voltage. Both the generator output (current and voltage) will be monitored by PLC controls and an onboard computer. Turbine speed will be adjusted to maximize current and voltage. The greater the power passing through the system, commonly known as system load, the greater the torque that is applied to the wind turbine main drive shaft by the generator dragging against the wind turbine. The turbine blade will convert wind energy to mechanical shaft power, which speeds up shaft rotation. The generator converts the shaft rotation into electrical power causing an opposing back mechanical torque on the same shaft.

As wind speed increases, mechanical shaft speed increases. Back torque is then applied to the shaft by the generator that is under load. The generator load will increase by reducing line resistance at the hydrogen generator (discussed below) and therefore increasing back mechanical torque on the shaft. A balance of maximizing wind/mechanical energy conversion (creating positive mechanical shaft torque) and back mechanical shaft torque is important to prevent possible run away speeds of the wind turbine. The turbine design will be limited to a maximum rotational speed to minimize the possibility of damage in high winds due to the forces involved with over speeding.

In the modern, hi-tech wind turbines an on-board computer will record both the real and apparent wind speed and angle, so that the blades of the turbine can be adjusted to an angle for optimum power. The use of variable pitch blades is well known and understood in the prior art. It is used not only for wind turbines, but also in marine propulsion screws, in airplanes, and in helicopters. The principle in regard to wind turbines is discussed in detail in U.S. Pat. No. 5,503,525, Pitch-regulated vertical access wind turbine, Brown, et al.

The apparent wind, in this case the wind relative to the turbine blades, is measured by means of transducers. The speed of the blades is also measured by different transducers. This technology is well known, and the wind speed and angle calculations are routinely performed in modern yachts, while the measurement of the shaft speed of the rotor is done by prior-art methods universally known and understood.

The turbine contains a number of blades which have adjustable angles of attack, defined as the angle between the front edge of the turbine blade and the direction of the wind flowing across the front edge. The angle of attack is adjusted to obtain maximum efficiency given the speed and direction of the apparent wind.

An added complexity is that the apparent wind is faster at the ends of the blades than in the center, since the blades are travelling faster at the edges than at the center. To compensate for this difference the turbine blades of the present invention have an angle relative to the plane of rotation, which continuously decreases along the length of the blade to some minimum angle at the end of the blades.

Wind Power Devices

To build upon the discussion above, the absolute available wind energy in a given space can never be completely absorbed by a wind machine. A German Physicist Albert Betz developed Betz's Law in 1919 described in his book "Wind-Energy" published in 1926. According to Betz's Law, the maximum energy that can be absorbed from a wind turbine is about 59% of the available energy (if 100% of the available energy was removed, the wind turbine would not turn because there would be no air flow through the turbine blades). At the same time, energy absorption is directly proportional to the amount of blade surface area driving an electrical generator. For a given area, the greater the blade area exposed to the wind, the greater the torque on the generator.

Common industrial wind turbines have 3 blades and do not take advantage of this basic concept. As a result, within the diameter of the turbine rotor, modern day wind turbines only absorb a fraction of the available wind going through that same space. The present 3-bladed approach has been almost universally adopted in prior art wind farms because almost all of their wind turbines are connected directly to the power grid. This requires strict quality standards for voltage and frequency of the generated electricity. Turbine speed, and therefore generator speed has to be maintained at a constant rate to meet these standards. Any fluctuation due to changing wind speeds is compensated for by feathering the turbine blades to spill air, thereby reducing the surface area exposed to the wind, and minimizing the variations caused by gusts. Also, the turbine blades themselves have to travel at relatively high rates of speed in order to meet frequency standards. This high blade speed exacerbates the effect of the wakes of one turbine blade on a nearby blade residing on the same rotor.

A typical standard 3-blade turbine design having a diameter of 20 feet has a blade area of about 18.5 $ft^2$ based on standard blade designs. In contrast a turbine with 30 blades of similar design with the same diameter has about 304 $ft^2$ of working blade area.

Figure 10:
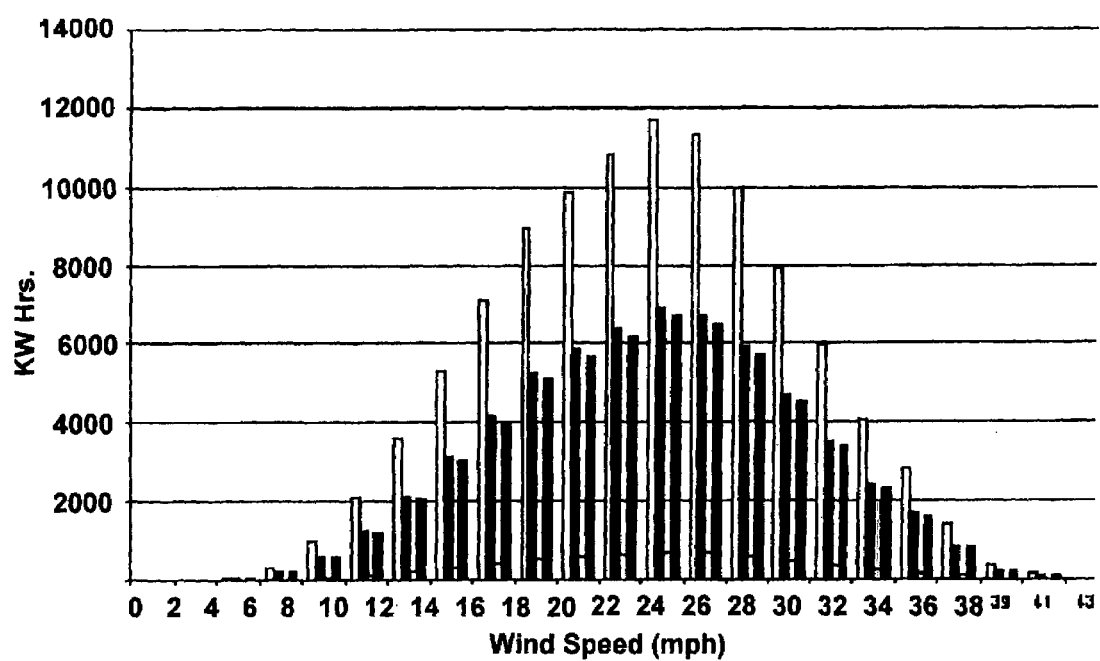
FIG. 10 is a chart compares theoretical power, available practical power and approximate power production for turbines having 3 blades with those having 30 blade designs.

In accordance with Betz's Law, the amount of practical power output for a 20-foot diameter, 3 bladed design is about 4.381 Kwatt-hours, while a 30 bladed design will theoretically produce 45,234 Kwatt-hours. The chart shown in FIG. 10 compares the annual power produced at the same wind speeds discussed and compares theoretical power, available practical power (Betz's Law) and approximate power production for turbines having 3 blades and those having 30 blade designs.

In this figure a comparison is made between 3 and 30-blade designs in which the surface area per blade is the same. The diagram demonstrates that the 30-blade rotor produces substantially more power than the 3 blade design.

In this diagram, the data is grouped into sets of four bars per set. The first, or left-most bar of each set represents the same data from FIG. 10, which represent the available energy in the wind in a 20 ft diameter space off the coast of Northeastern United States. The second bar of each set, to the right of the first bar, represents the impact of Betz's Law on the available wind or what can be practically extracted from the wind by a perfect wind turbine. The third bar of each set, to the right of the second bar, represents the wind energy transformed into mechanical energy with a 3-bladed design. Finally, the fourth bar of each set, to the right of the third bar, represents the wind energy transformed into mechanical energy with a 30-bladed design.

As an alternative manner of viewing this figure, the white bars represent the theoretical power available, the tallest black bars the results of Betz's law, the shorter black bars the calculated effect of a 30 blade turbine or turbine utilizing the maximum available rotor surface area and the short white bars represent the calculated effect of a three bladed turbine of the same diameter and same blade size as the 30 blade example.

These diagrams show that 30 blade turbines provide a much greater opportunity for converting most available wind energy to mechanical energy, based on their greater surface area exposed to the wind. Utilizing more surface area to capture the wind sharply increases annual energy conversion.

Blade Construction:

In the present invention the wind turbine contains a number of blades, each in close proximity to the adjacent blades. The design is depicted in FIG. 3. The collection vessel is viewed head on, with the bow 4 in view. The wind turbine 6 is seen to contain a large number of blades 7, packed tightly together. Whereas standard turbine blades are long and thin, the blades of the present invention are equally long, but are wider than standard turbine blades. As a result, the force on each turbine blade is less than that of the standard turbine for the same power produced, since each blade takes a proportionally smaller force.

As a result, each of the blades can be made of lighter, thinner material than in the standard wind turbine.

Furthermore the blades of the present invention do not travel as fast as prior art blades; therefore, there is a lower dependency on high efficiency aerodynamics. The present blades do not present a perfectly aerodynamic airfoil design.

The present blades are of a much lighter construction than prior art blades. Support wires, or stays, are used in the blades of the present invention to provide strength and reduce the cost of construction normally associated with manufacturing high tech/high efficiency/high strength composite blades. Traditional strut and covering construction will be used in this invention to allow for lightweight, high-strength and low cost blades.

Figure 4:
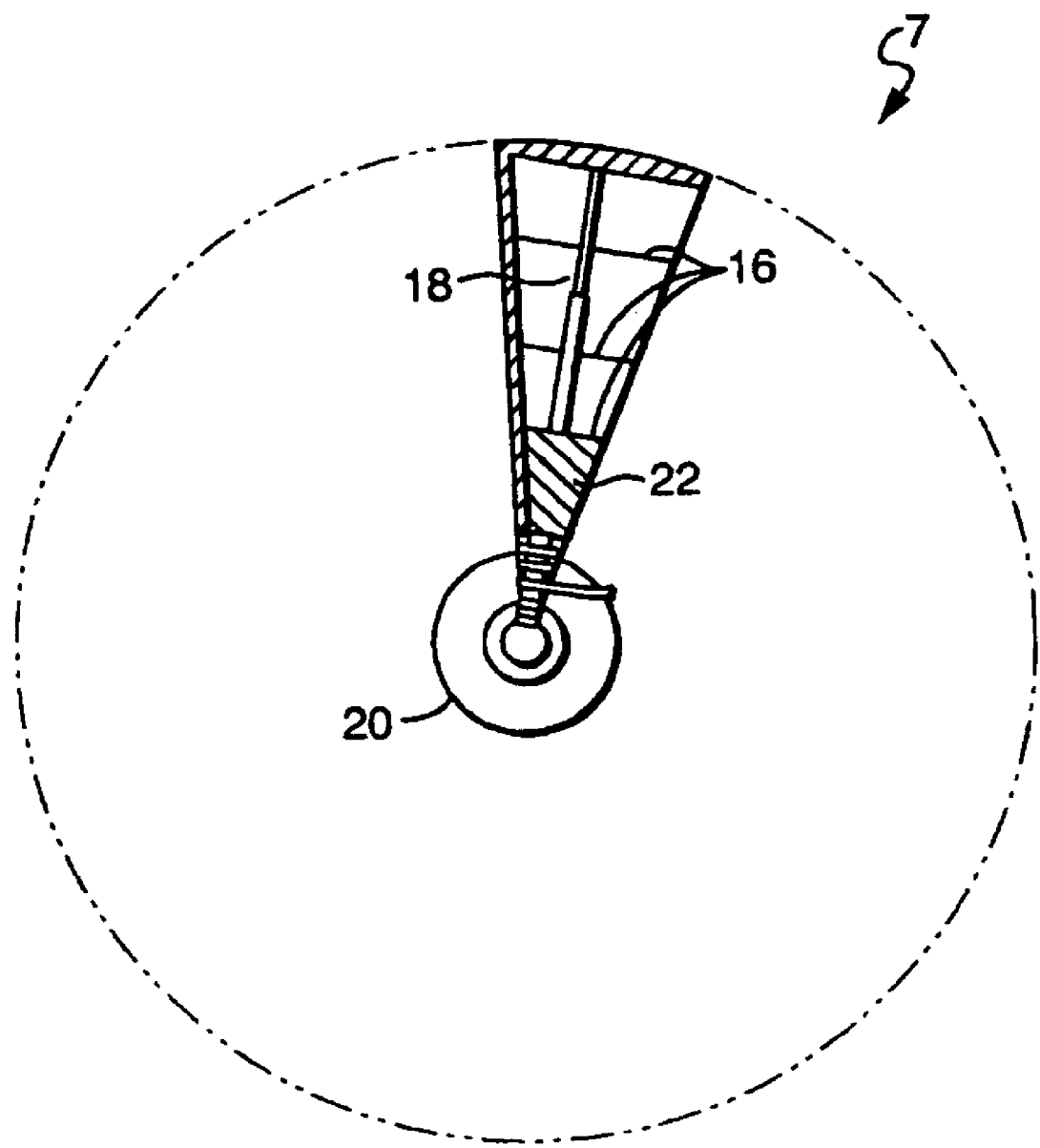
FIG. 4 depicts a front elevation view of a wind turbine, with only a single blade shown in detail.

Such a configuration is shown in FIG. 4. A single blade 7 is depicted, although in practice the turbine will contain a multiplicity of these, as seen in FIG. 3. Still referring to FIG. 4, the blade is affixed at its center to an armature 20, which rotates and causes the blades to rotate with it. The blade contains a central beam 18 lengthwise through the center of the blade. It is covered by a foil 20, which is shown only extending between the hub and the strut nearest to the hub, but which, in actuality extends over the entire surface of the blade.

The preferred embodiment uses a 30-blade rotor. In other embodiments different numbers of blades per rotor may be chosen, in order to maximize available total rotor surface area within a given rotor diameter.

Figure 2:
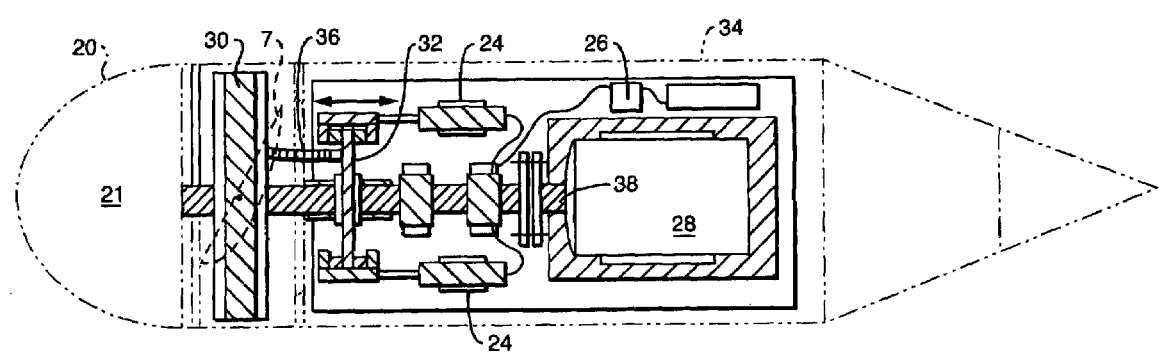
FIG. 2 depicts a top plan view of a wind-based power collection vessel.

Adjusting the angle of attack of the rotor blades is effected by a hydraulic system. Referring next to FIG. 2, a cross-section view of the armature on the wind turbine is shown. A primary disc 30 is caused to rotate by the wind, the blades 7 rotatingly attached to the primary disk, so that the angle of attack can be altered. A central shaft 38 communicates between the mechanical elements in the armature 20, and the control module 34 located in proximity to the armature. When this central shaft rotates, the secondary disk 32, and the main generator 28 are made to rotate at the same rotational speed. Hydraulic cylinders 24 cause the rotating secondary disk to slide to the left as shown in the diagram, thus moving the activation arm, which controls the angle of attack of the blades 7. Control of this mechanism is done by a computerized control system, taking into account the actual and apparent wind speed and directions, in order both to maximize efficiency of generation of electricity, and to protect the wind turbine blades in high winds.

Wave Power Devices

The Wave Collection Vessel

As previously discussed, the prior art teaches a number of different designs for wave power conversion. In particular, the oscillating water column approach, and the Tapered Channel (TAPCHAN) types, have been found to be practical for sea-based wave power generation systems. Both of these approaches are also applicable in the present systems in alternative embodiments. However, the first preferred embodiment utilizes the valve wall system, described above. The embodiment of the wave collection vessel described following is dependent upon incorporation of the valve wall system of wave power generation.

Like the wind power collection vessel, the wave power collection vessel is kept relatively stationary in the ocean through the deployment of a sea anchor disposed off the bow of the vessel, which keeps the bow facing the wind, and therefore the waves. In the same way that a conventional anchor affixed to the sea bed will keep the bow of a vessel headed into the wind, the sea anchor provides a countervailing force to the backward drift of the vessel. Unlike a sea-bed anchor, however, the sea anchor will not prevent the vessel from drifting entirely, but will substantially slow the rate of drift.

Figure 11:
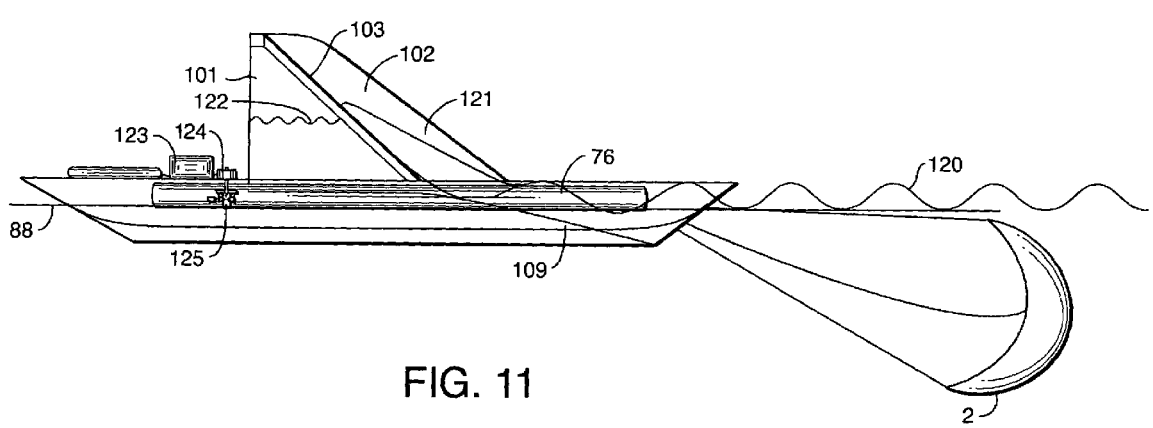
FIG. 11 depicts a side elevation view of a wave-based power collection vessel in collection mode, with sea anchor set.
Figure 12:
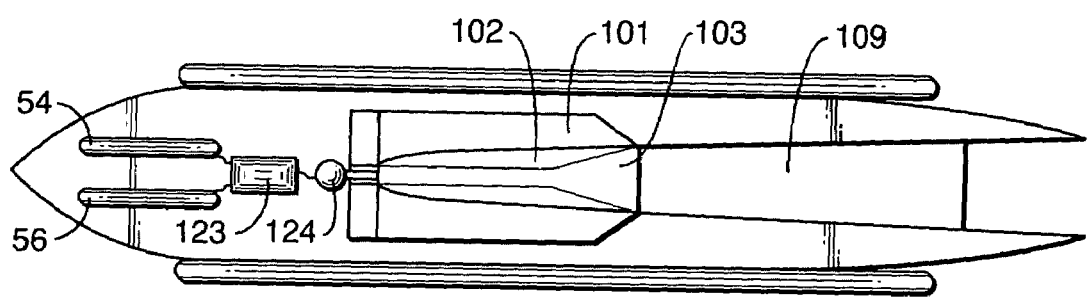
FIG. 12 depicts a top plan view of the wave-based power collection vessel.
Figure 13:
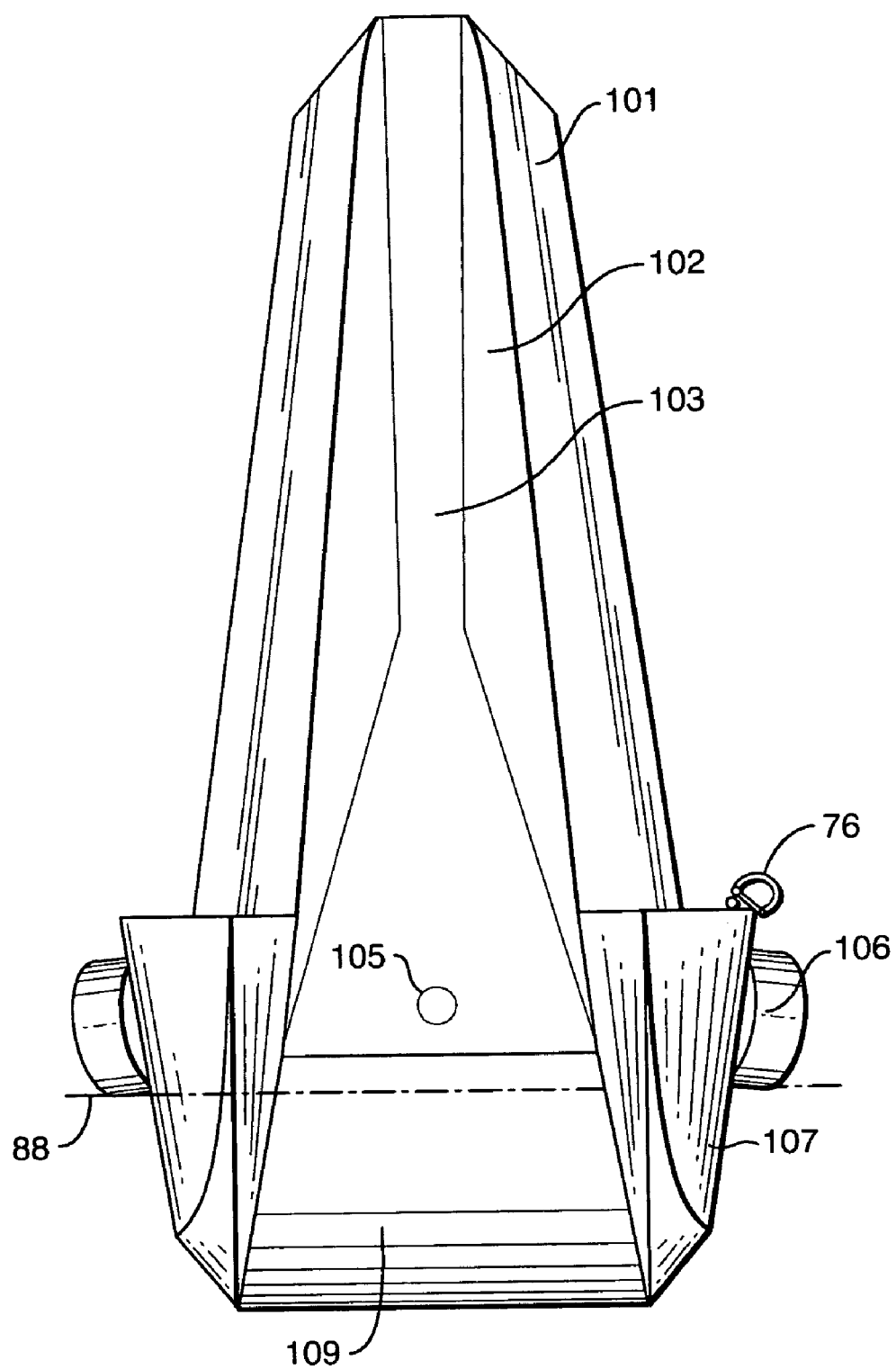
FIG. 13 depicts a front elevation view of the wave-based collection vessel, as seen from the stern.

The stern of the collection vessel contains a channel similar to the prior art TAPCHAN system described in Appendix C. Referring now to FIGS. 11, 12, and 13, it is seen that a wave has entered the wave collection channel 109, the channel amplifying the wave height, and directing it against the valve wall 103.

FIG. 12 depicts the wave power collection vessel as viewed from above. Referring now to this figure it can be seen that the tapered channel occupies a substantial portion of the stern of the boat, which faces the approaching waves. The side walls 102 of the valve wall are tapered upwards to retain the wave as it breaks on the valve wall, and this tapered aspect may also be seen by referring to FIG. 11, which shows the collection vessel as viewed from the side. FIG. 13, which views the vessel from the bow, also shows these side walls.

Still referring to FIG. 13, as well as FIG. 11, it may be seen that the bow end of the tapered channel 109 is disposed below the waterline 88, to allow for trough of a wave to ascend the tapered channel even when the stern of the collection vessel is riding up on the crest of a prior wave. In this manner, the maximum volume of water is collected from each wave.

FIG. 13 also reveals the relative dimensions of the valve wall 103, the collection chamber 101, and tapered channel 109, as well as showing the height of the tapered channel relative to the beam of the collection vessel. Because the center of gravity of the vessel is raised substantially when the collection chamber 101 fills with water, stabilizing pontoons 88 are provided to prevent excessive roll of the vessel.

An array of check valves is disposed across the entire surface of the valve wall. These check valves allow the water to pass from the tapered channel into the collection chamber, but prevent the water from flowing back from the collection chamber through the valve wall. Thus, a portion of each wave will pass through the check valves of the wall and into the collection chamber. The rest of the water will flow over and around the valve wall and collection chamber, or will pass back down the tapered channel into the sea.

Still referring to FIGS. 11 and 13, the floor of the tapered channel has a shallow slope beginning below the water line so that it may capture most of vertical height of the wave above its trough. As the wave travels into the collection channel, the channel floor slopes up along its length as the channel progressively narrows, so as to convert much of the horizontal energy of the wave to vertical energy, elevating the wave above sea level.

The portion of the channel below the water level of the collection vessel has a width approximately equal to the beam of the collection vessel, as may be seen from FIG. 12. At the point where the tapered channel terminates in the valve wall the width of the tapered channel, as well as that of the valve wall, is between one-half and two-thirds of the beam of the vessel.

The valve wall also narrows as it extends upward from the inboard end of the tapered channel, since the volume of water contained in each wave diminishes with height. The collection chamber 101 likewise tapers as it rises upwards from the deck of the collection vessel. As a result the volume of water in the channel decreases as the height of the wave increases. This prevents the vessel from becoming unstable as the center of gravity of the vessel rises due to the inflow of water in the tapered channel.

Figure 14:
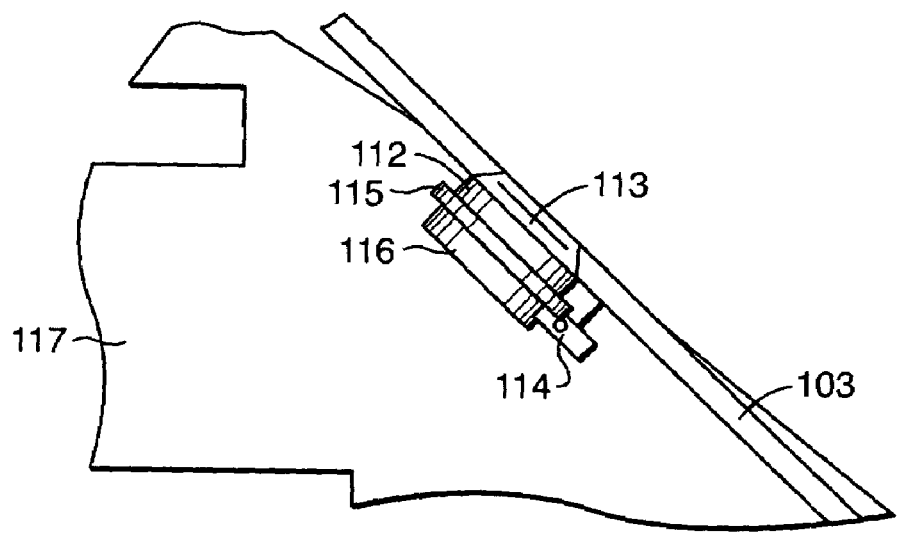
FIG. 14 depicts a cross sectional view of a swing check valve.

Referring next to FIG. 14, the detailed operation of the valve wall itself may be understood. The valve wall 103 contains a multitude of check valves, separated by a distance approximately equal to the aperture of each valve. The greater the number of check valves in the wall the greater the volume of water will be captured with each wave which is collected. However, the check valves cannot be spaced too close together without weakening the wall itself, which must withstand the force of successive waves breaking upon it.

The wave power system describe herein may be considered as a modified version of the TAPCHAN system. The improvement provided by the valve wall increases the efficiency of the system, especially under conditions of reduced wave heights, because it is not now necessary that the waves exceed the height of the walls of the collection vessel as they enter via the tapered channel.

Once the water has entered the collection chamber, the present system operates in a manner similar to the prior art TAPCHAN system. The water within the collection vessel exits via a turbine 124, which is coupled to an electric generator which produces electrical energy. In the present invention, however, unlike the prior art TAPCHAN system, the electrical energy produced by the turbine is then used to produce hydrogen and oxygen by means of electrolysis.

It should be emphasized that although the preferred embodiment of the present invention utilizes the valve wall/tapered channel system for generation of electricity from wave power, as described below, most of the other prior-art systems for wave-power electrical generation may be used in place of the valve-wall approach in other embodiments of this invention.

Operation of the Valve Wall

As waves riding up the tapered channel impinge on the valve wall a certain amount of water will pass through, depending upon the force of the wave and the amount of water in the collection chamber on the other side of the wall. In the preferred embodiment the wall face is disposed at approximately 45 degrees to the earth's gravitational force. The water will pass through the check valves providing that the force on the wave side of the valve wall is greater than that on the opposite, or collection chamber, side. The force on the wave side of each check valve is dependent upon the force of the water as it rides up the collection channel and onto the valve wall, and upon the cross sectional area of the opening in the valve seat of the check valve. On the collection chamber side the countervailing force for a given check valve depends almost entirely on the height of the water column in the chamber above the valve, and the cross sectional area of the opening of the check valve seat. When the force on the wave side is greater than that on the collection chamber side for a particular check valve, water will pass through to the collection chamber side. Otherwise, no water will pass through from the collection chamber side to the wave side.

Figure 16A:
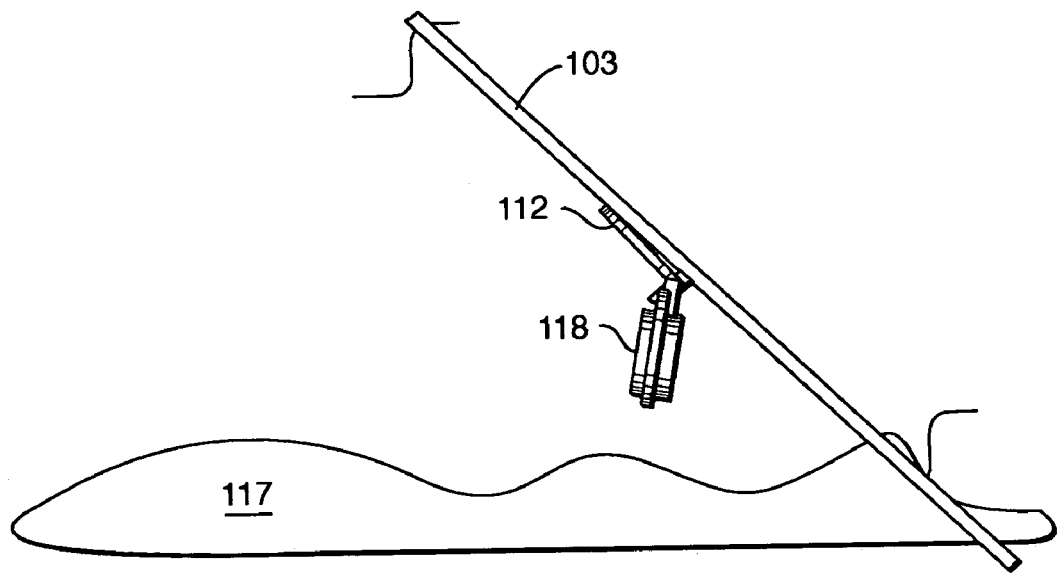
FIG. 16A depicts a valve wall with collection container empty.

Although there are many different types of check valves known in the prior art, the present invention utilizes a "swing valve" type which is illustrated in FIG. 14. Referring to this figure, the valve is made up of a valve seat 112, and a disc 115 which rotates about hinge 114, thereby closing valve aperture 113 as the valve closes, and opening the aperture as the valve opens. Fluid Pressure on the left side of the valve wall due to the water 117 within the collection chamber will cause the disc to swing closed, while water pressure on the right side of the valve wall will force open the valve, causing the hinge 114 to swing clockwise, the disc typically reaching maximum position as seen in FIG. 16A. It is important that this open position never exceeds 90 degrees, because pressure on the disc caused by the buoyancy of the water 117 as it rises in the collection chamber must cause the disc to return toward the valve seat 112, rather than causing the disc to rotate in the opposite direction.

In the present invention a modified version of the swing valve is used, as shown in FIG. 14. This modified swing valve requires that the disc 115 be buoyant, so that the rising water causes the disc to rise toward the valve wall 103, as the buoyant force of the water increases as it rises under the disc. The disc must therefore have a density less than that of water to provide such a buoyant force. This can be accomplished by either using a buoyant material in fabricating the disc, making the disc hollow, or attaching a buoyant material 116 to the disc, as in the embodiment shown in FIG. 14.

Referring now to FIG. 14, it may be seen that in one preferred embodiment each individual valve has a floatation disc affixed to the back of the valve disc that lifts the valve into a seated, close position as water rises around it. Once in place the back pressure from the water head created by the column of water in the holding tank will keep the valve shut by increasing force on the valve seat as the head height in the holding tank increases.

The action of the check valve may be understood by referring to FIGS. 16A through D, in which the collection chamber is filled progressively by successive waves. Referring first to FIG. 16A, the water in the collection chamber is so low that the pivot valve disc 15 hangs almost straight down, since the only force on the valve is that of gravity.

Figure 16B:
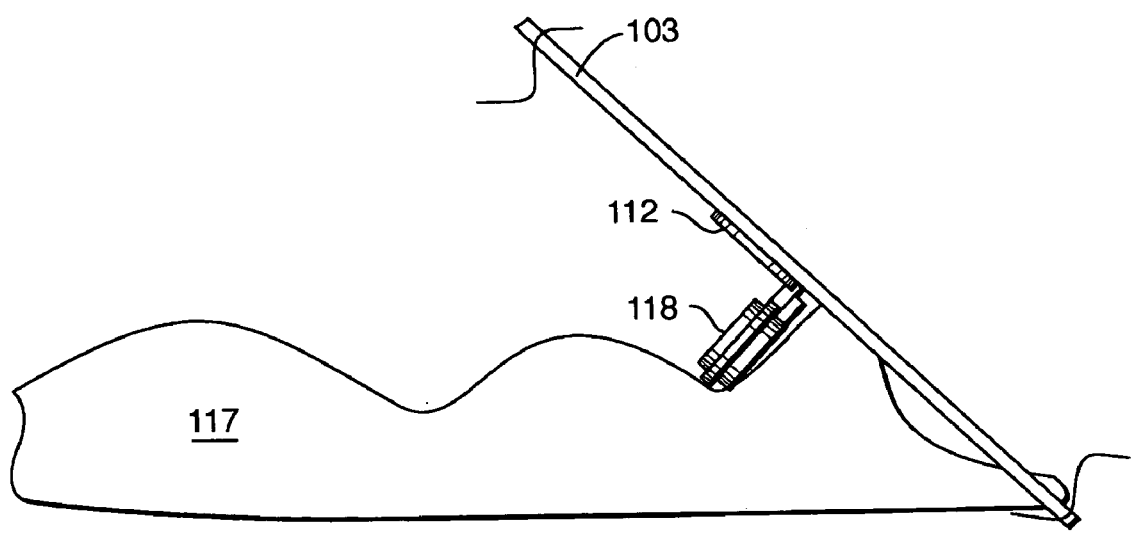
FIG. 16B depicts a valve wall with collection container partially filled.
Figure 16C:
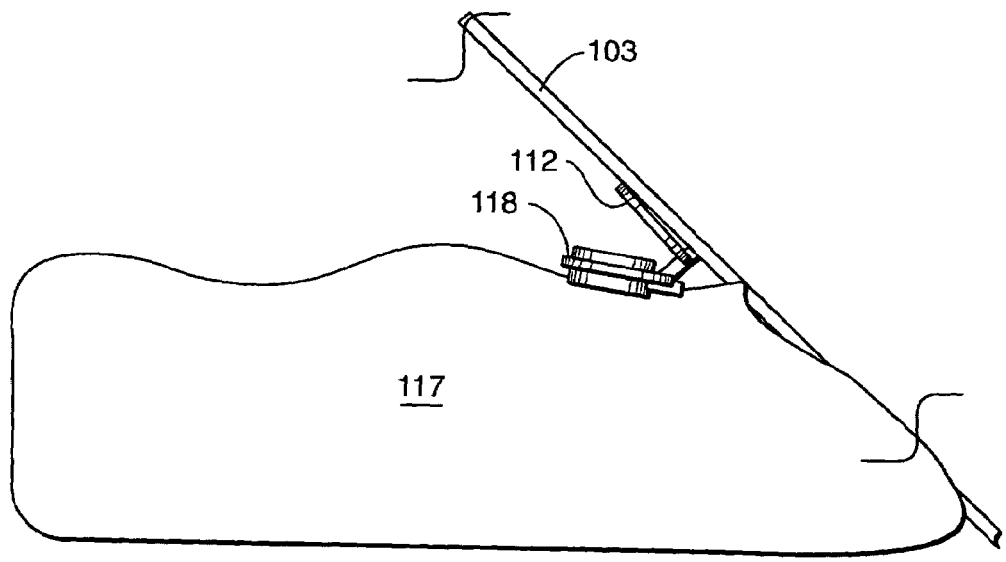
FIG. 16C depicts a valve wall with collection container almost filled.
Figure 16D:
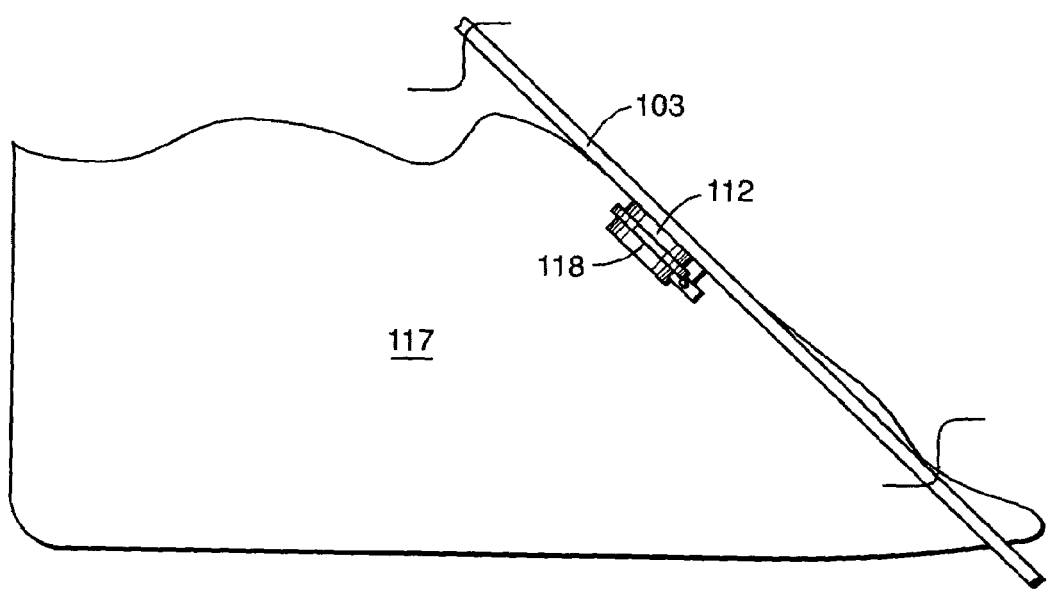
FIG. 16D depicts a valve wall with collection container filled to the point that the check valve is closed.

Referring next to FIG. 16B, the water has begun to rise causing the disc to rise toward the valve seat. The water rises further in FIG. 16C, as the valve continues to close. And finally, in FIG. 16D, the water has risen above the level of the check valve, so that the valve has closed completely.

Although FIGS. 16A through D depict only a single check valve, the valve wall contains an array of such valves in the preferred embodiment, the valves occupying about 50% of the wall area. The proximity of the valves to each other is limited only by the need to maintain the strength of the wall in the face of recurring blows of the waves as they impinge on the wall. Clearly the valve wall's strength is diminished by each wall aperture 113 formed in the wall.

Figure 15:
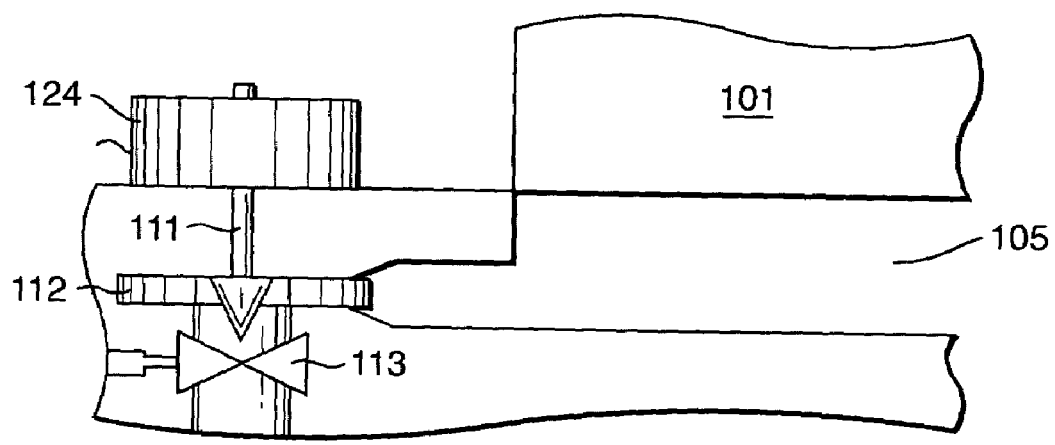
FIG. 15 depicts a cross sectional view of a water turbine.

Each check valve will open when the pressure on the wave exceeds the pressure on the holding tank side, or when the water level in the collection chamber side falls below the level of the check valve. The net result is that the collection vessel will continue to fill by the action of the waves against the valve wall, but will empty by the flow of water out of the collection vessel through the water turbine 132, as shown in FIG. 15.

Still referring to this figure, the column of water in the collection vessels creates a hydrostatic head pressure at the bottom of the tank forcing the water through the turbine feed port 105 at the bottom of the collection chamber past a turbine impeller, thereby causing it to rotate. The shaft of this turbine 111 is coupled to a hydro-electric generator 124 which generates the electrical power used to generate hydrogen and oxygen by hydrolysis, as described infra.

The higher the level in the holding tank the greater the head pressure and the more power output is generated by the hydro-electric generator, within bounds. However, it is desireable to control the rate of rotation of the turbine within reasonable bounds, to prevent damage to the turbine and generator components. For this reason a control valve is disposed in the discharge channel 130 leading from the turbine and sending the effluent overboard after it is spent. This control valve is regulated by means of a PLC controller that senses the water level in the holding tank, since the speed of the turbine rotation will be a function of the hydrostatic head in the holding tank.

Hydrogen & Oxygen Generation:

The science of electrolysis has been known for over one hundred years. In the present invention the electricity generated by the generator is used as a source of power for electrolysis, which produces hydrogen and oxygen.

When a DC voltage is applied across a cathode and anode immersed in salt solution, positive and negative ions collect on the electrodes. A typical salt used is KOH (Potassium Hydroxide), which provides the ions to create a conductive path. Water will then be split into its elements. Hydrogen will form on the negative electrode and oxygen will form on the positive one. The gasses will continue to form until sufficient quantities cause them to rise through the water and collect as gas bubbles at the water surface.

Figure 5:
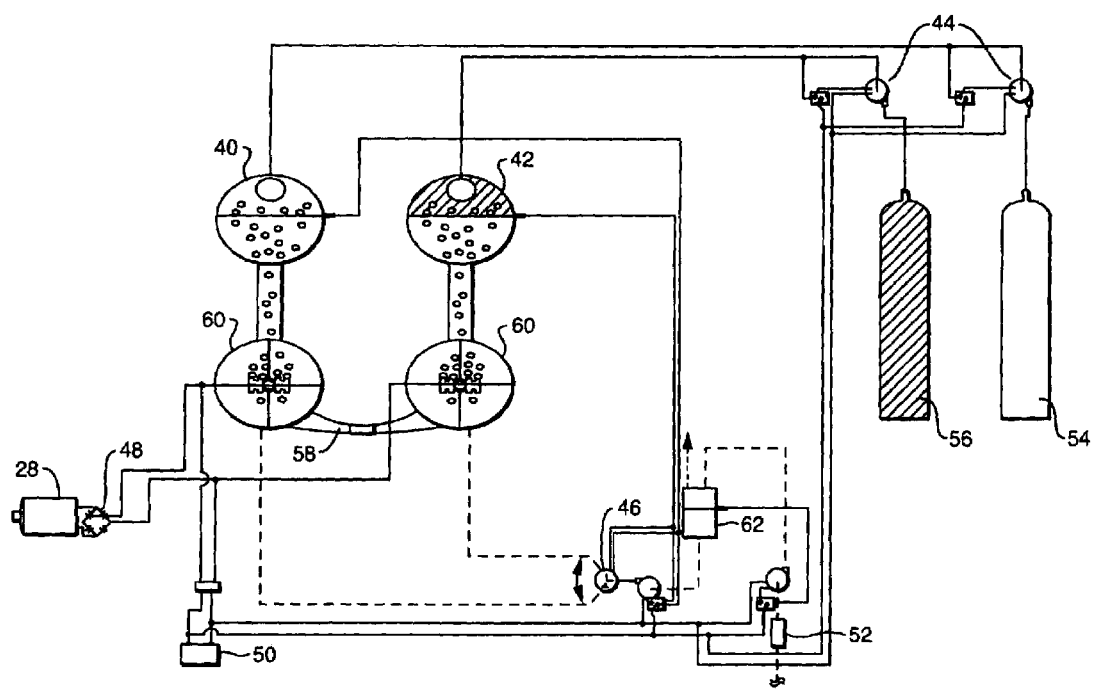
FIG. 5 depicts a hydrogen-oxygen-generator.

Referring now to FIG. 5, the electrolysis system is shown in cross-sectional view. The hydrogen reactor 40 and oxygen reactor 42 are filled with a salt solution of KOH. Each contains a carbon electrode 60 immersed in the solution. A bridge 58 connects the solution from the two reactors, allowing the migration of ions between the electrodes. The hydrogen gas collected at the hydrogen reactor 40 is pumped into the hydrogen cylinder 54 by means of a compressor, separately from the oxygen, which is pumped into the oxygen cylinder 56 by means of a separate compressor. Care needs to be taken to collect the oxygen and hydrogen separately since they will recombine to form water if allowed to do so, with a danger of explosion.

The rate of generation of the gasses is directly proportional to the amount of power applied, which is the product of the voltage across the electrodes and the current passing through the electrodes and through the solution.

The electrolysis system of the present invention is constructed from materials that will minimize the corrosion. The electrodes are constructed from carbon, that will not break down during electrolysis.

Purified water is used as the starting point for the salt solution, and is first stored in the purified water reservoir 62. It is pumped into the reservoir through a small micron filter 52 intended to remove any organic impurities. Providing a 1 to 2 micron filter in this manner will minimize the number and size of organic chemicals in the system. For the purposes of generating commercial hydrogen and oxygen, an impurity level less than 0.5% would produce oxygen and hydrogen of sufficient purity for industrial purposes. If needed, however, additional industry standard purification processes can be used as needed to further refine the gasses at a shore based facility.

In an alternative embodiment sea water is used as the starting point for the generation of the KOH salt solution. The obvious advantage of using sea water needs no further amplification. However, it is necessary to first remove all of the significant chemicals from the sea water using purification techniques already in existence before adding the KOH required in the current method. The decision as to whether purify sea water on board, as opposed to transporting water purified on shore, is one based on considerations such as economies of scale. Alternatively, the decision is based on whether it is more energy efficient to purify water on shore, and to transport it to the collection vessels by the storage vessels shuttling back and forth from shore, or, conversely to purify sea water on board the collection vessel.

The presence of organic material in the solution would mix with the salt solution, and could cause additional gasses to be emitted together with the Hydrogen and Oxygen. Nitrogen gas, for instance, is one of the contaminants that result from organic chemicals in the water.

After filtering the purified water, KOH is added. The solution is then in condition for the electrolysis process to begin.

Electrical power is supplied to the solution by the generator 28, which, in the preferred embodiment, is a single-phase synchronous generator. A back-up battery 50 is provided for starting the generator after periodic idle periods due to a lack of wind. The battery is charged during times of energy production by the generator. AC power is converted into DC by a full bridge rectifier 48, which is connected to the carbon electrodes 60 immersed in the KOH solution as discussed above.

Gasses are pumped away at approximately the rate that they are produced. Since there are two hydrogen atoms for each oxygen atom in water, twice as much hydrogen will be produced as oxygen. Sensors in the system will sense gas and solution levels in the system and control valves and pumps to maintain levels as required.

Figure 6:
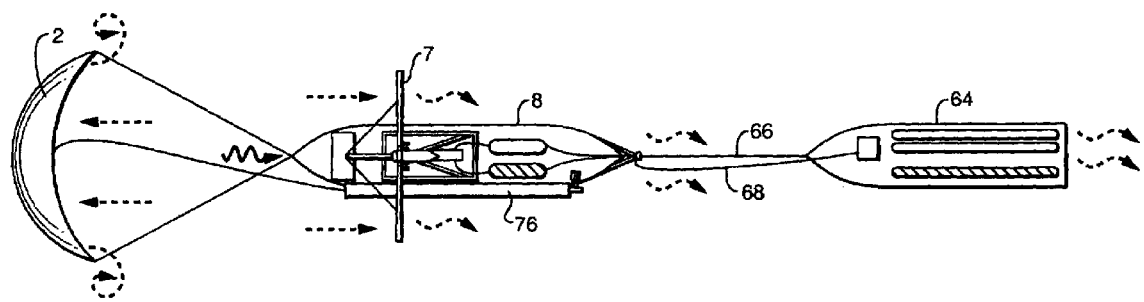
FIG. 6 depicts a top plan view of a collection vessel in collection mode attached to a storage vessel.

Transfer and Distribution:

Referring now to FIG. 6, there are two vessels involved with retrieving, compressing and storing product gasses. The collection vessel 8 has a small storage capability in which the hydrogen and oxygen cylinders are stored, sufficient to power the propulsion system of the collection vessel as required for maneuvering. The storage vessel 64, is affixed to the collection vessel by towlines 66.

Once the onboard storage containers in the collection vessel are filled to capacity, a sensor will detect the pressure and trigger an onboard booster pump on the storage vessel to start pumping. The line connecting the two vessels has a dual purpose. Besides securing the two vessels together, they support gas transfer from the collection vessel to the storage vessel, and further support transfer of purified water lines between the vessels, to allow refreshing of the solution in the electrolysis chambers.

The booster pump will pump down the smaller containers on the collection vessel until they fall below a lower pressure value, at which point the pump will shut off. When the pressure begins to build back up due to new gas production on the collection vessel, and exceeds a high pressure value the pumping will start up again.

Once pressure levels in the storage vessel reach a maximum storage control value, a sensor will trigger a radio message to a shore-based control center to send a second storage vessel to the site of the now-full storage vessel. When it reaches the site a final message will be sent to the control center to stop transferring the gasses and to then detach the storage vessel from the collection vessel. The second storage vessel is then remotely navigated to the collection vessel where the two are docked. The collection and storage cycles are then re-initiated.

The newly arriving storage vessel, which is self-propelled, will supply purified water to the collection vessel, which is then used to refresh the salt solution used for electrolysis.

In order to facilitate the transfers of gasses at sea as just described, the vessels will have remote docking capability, similar to air-to-air refueling systems currently being practiced by the armed forces.

Figure 9:
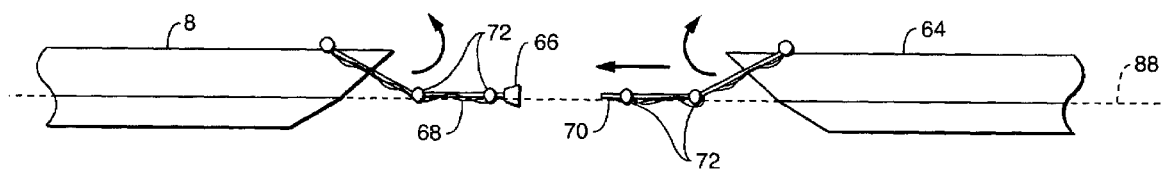
FIG. 9 depicts a side elevation view of the bows of two vessels beginning a docking operation.

The system of the current invention would utilize a similar technology. Referring now to FIG. 9, a collection vessel 8 and a storage vessel 64 are approaching each other. The female end 66 of the transfer line is floating in the water, connected by hydrogen, oxygen and water feed lines to a securing cable 68, while the male end 70, connected to the storage vessel is lying in proximity. The male & female ends are rigid so they cannot rotate laterally but they can pivot vertically, so that they will effectively ride atop the waves. Flotation buoys 72 keep the transfer line afloat. Through the use of inexpensive sensors and computer controls the docking maneuver is automated so that a minimum of human intervention is involved.

In a further embodiment the docking maneuver is totally automated, once the vessels are maneuvered to a predetermined distance from each other.

In one of the preferred embodiments a central discharge station is used as an intermediate storage location. It is located on the water, but where the depth of the water is sufficiently small so that a pipeline can be conveniently laid, to relay the stored gasses to a shore storage station.

Docking to the central discharge station would even be performed in a similar manner to the docking between vessels at sea. Automated docking is the preferred method, but manual override is available as a back up option should the autonomous docking system experience problems.

The entire system is under the control of a shore-based central control center where all vessel movement and off-loading is controlled. All vessels will have the same navigational capability, which is monitored and remotely controlled from this location. This central control center is the only location requiring human, hands-on operation. All other activity in the system, with the exception of maintenance, is at the central control center through the use of remote controls and communications. As a result the potential safety risks of handling vessels at sea loaded with hydrogen is minimized.

Vessel Drift

Figure 8A:
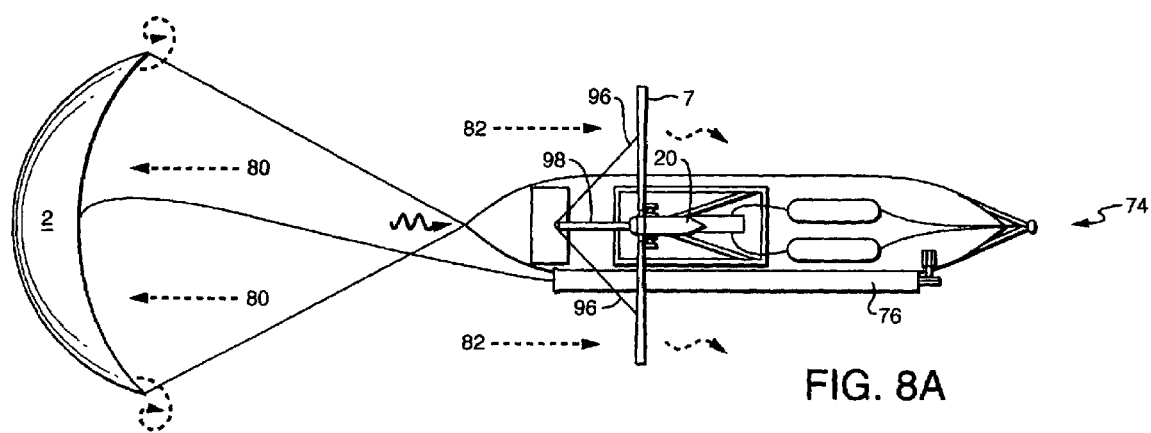
FIG. 8a depicts a top plan view of a wind-power collection vessel in collection mode, with wind turbine set up for operation.

The collection vessels and storage vessels, while not under power for navigating to a new zone or changing storage vessels, will drift in a controlled manner from the force of the wind. FIG. 8a shows a collection vessel in collection mode, with the sea anchor 2 deployed. The rate of drift will depend upon the speed of the wind, as well as any local tides. A sea anchor 2 also keeps the turbine facing the wind in order to maximize turbine efficiency. As previously stated the sea anchor further minimizes drift.

Repositioning of vessels drifting outside their predetermined zones is accomplished with the aid of GPS systems on-board the collection vessels that continuously monitor the vessel position, and relay this information back to the control center. If any of the vessels require repositioning their onboard propulsion systems are started in order to navigate to the new position.

In the wind propulsion systems, prior to retrieving the sea anchor the engines are firing up, the turbine blades are feathered and then retracted. The collection vessel is then maneuvered forward to relieve tension on the sea anchor and its lines so that it can then be retrieved. Once the sea anchor and turbine blades are secured, navigation to a new location can occur. Once the new position is achieved, the sea anchor is redeployed to continue converting wind energy to mechanical energy.

In the case of the wave power systems, repositioning is slightly different. As the wave vessels reposition, each propulsion system backs up the vessel to relieve pressure on the sea anchor. The sea anchor is then retracted and the vessel is propelled forward, with the wave channel trailing, to navigate to a new position.

Handling of the wave power collection vessels in heavy seas requires special treatment. The sea anchor is first retracted, the bow swung into the oncoming sea by the onboard propulsion system, and a smaller sea anchor is deployed from the bow to hold the vessel in a relative position with the bow facing the sea. This maneuver is similar to the way that life boats are managed in high seas.

Once the storm subsides and the seas calm, and assuming the vessel is still well within its operating zone, the smaller sea anchor is retracted, the swung back into the on coming sea, and the main sea anchor redeployed to continue the wave energy conversion operation.

If the vessel is outside of its operating zone after the storm, the on-board propulsion system repositions the vessel to a more desirable location within the zone, and then the main sea anchor is be redeployed at the stern.

Referring now to FIG. 8a, it may be seen that when deployed the sea anchor 2 is forced taught by the force 80 of the water filling the anchor like a parachute while the collection vessel is pushed by the wind 82. The higher the wind the more the anchor will resist the force of the wind on the vessel. Furthermore, the sea anchor aligns the bow of the vessel directly into the wind.

The collection vessel continues to drift in this way until the vessel has drifted outside of the zone boundaries, and therefore needs repositioning. Before getting under way, the sea anchor must be retrieved otherwise the vessel may move into the sea anchor, fouling the vessel, and damaging or destroying the sea anchor.

Figure 8B:
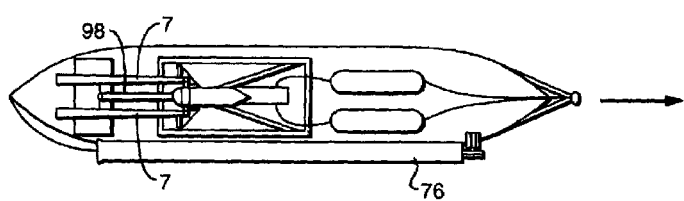
FIG. 8b depicts a top plan view of the wind-power collection vessel in navigation mode, with the wind turbine set up for navigation.

Referring now to FIG. 8b the collection vehicle has been reconfigured so that it may safely navigate to a new position. The blades 7 have been retracted into a position facing the bow of the collection vehicle and the sea anchor 2 has been stored in the sea anchor storage compartment 76.

Figure 7:
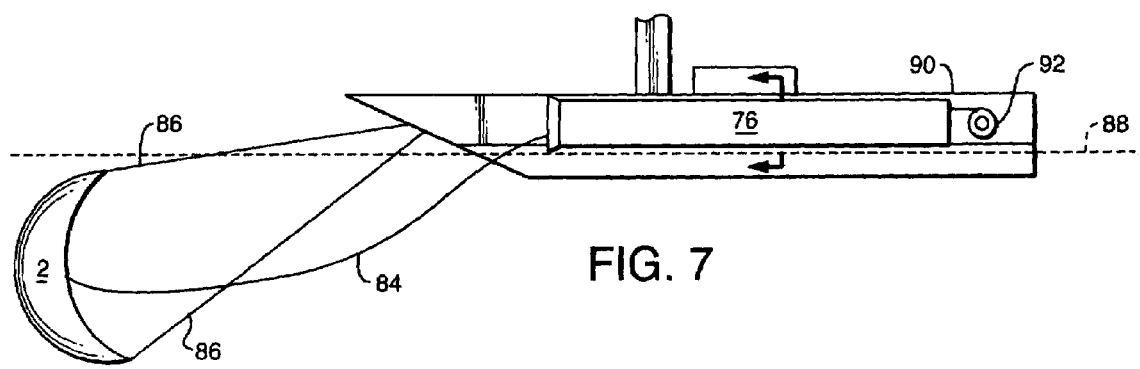
FIG. 7 depicts a collection vessel with sea anchor, cables, and sea anchor storage tube shown.
Figure 7A:
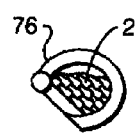
FIG. 7a depicts a cross section view of the storage tube, closed, with sea anchor within.

Referring next to FIG. 7a retraction of the sea anchor is accomplished by means of a retraction cable 84 connected to the center of the sea anchor 2. The retraction cable is limp as shown in FIG. 7a when the sea anchor is deployed and under tension when retracting the sea anchor.

To retract, the vessel would move forward slightly using its onboard propulsion system and begin to draw the retraction cable into the storage tube 76, which is secured on the vessel, by means of an onboard retraction winch 92 which are powered by the rechargeable batteries. As the retraction cable 84 becomes taught, drawing the center of the sea anchor toward the vessel, and the sea anchor disposal cables 86 become slack. The sea anchor collapses as the "parachute" shape is destroyed, and its drag on the collection vessel is drastically reduced, allowing the sea anchor to be winched in.

The winch 92 which draws in the retraction cable 86 is located on the back-end 90 of the storage tube and draws the retraction cable through the storage tube 76, located along the length of the vessel hull. A cross-section of the storage tube is shown in FIG. 7a, with the sea anchor 2 stored within.

Figure 7B:
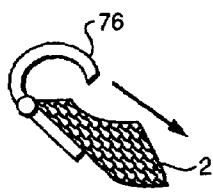
FIG. 7b depicts a cross section view of the storage tube, open, with the sea anchor beginning to descend.
Figure 7C:
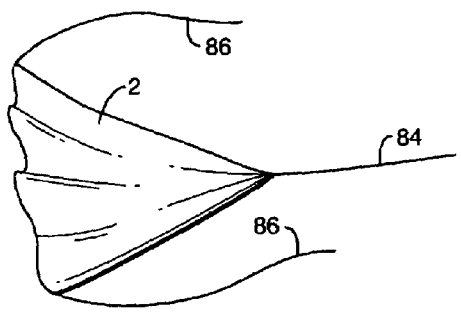
FIG. 7c depicts a side elevation view of the sea anchor being retracted.

When the new desired position is achieved, the collection vessel pulls into the wind and the sea anchor is re-deployed. The storage tube is hinged along one side, as shown in the cross-sectional view of FIG. 7b, so that the tube opens along its entire length, allowing the sea anchor to fall into the water below when the tube opens. Backing the vessel further assists the deployment of the sea anchor.

Once deployment is complete, the turbine blades are rotated into position and the on-board engines are shut down.

Wind Turbine Retraction:

The ability of the wind turbine blades to retract for the purposes of vessel transport and vessel protection during high windstorms is a truly unique feature for wind turbine designs.

In standard wind turbines the blades are subject to high shear forces, requiring thick bases and heavy composite construction to withstand high torques at the base of the turbine blades where they meet the armatures. In the present design, in contrast, the blades are subject to forces which act largely in compression so that torques at the armature are minimized.

Because of the diminution of forces in the present design a much lighter-weight construction is possible. Referring again to FIG. 8a, wire stays 96, or guy wires, support the turbine blades, which can be of lighter construction as a result of the support of the stays, which are secured at one or more points along the length of the blades at one end, with the other end secured to the center of the armature extension. The extension protrudes from the center of the armature nose 21 and is approximately equal in length to two-thirds the length of a blade. Each blade is supported in this manner resulting in multiple cables converging at the armature nose extension end.

When the collection vessel is under power the turbine blades must be first stowed, as shown in FIG. 8b. As seen in this figure, the stays have been retracted in the armature nose extension, thereby keeping the blades from opening. The blade bases are hinged where they meet the armature, and the blades themselves must be rotated to a completely feathered position prior to retracting. With a high number of turbine blades in close proximity, as shown in FIG. 3, feathering is essential before retraction so that the blades do not physically interfere with each other when retracted.

While the invention has been described with reference to specific embodiments, it will be apparent that improvements and modifications may be made within the purview of the invention without departing from the scope of the invention defined in the appended claims.

What is claimed is:

1. A method for generation of gasses contained in a salt solution by the steps of:
    (a) disposing one or more collection vessels, each containing a wave power generation device, in waters distant from a proximate shore within one or more predetermined geographic zones, each of said zones having suitable sea conditions for said wave power generation, being without established shipping lanes, and providing communication between the collection vessels within the zone and a command center;
    (c) generating electricity on each collection vessel by an electrical generator connected to each of the wave power devices;
    (d) extracting said gasses from a salt solution by means of electrolysis using said electricity; and
    (e) locating one or more storage vessels within each predetermined zone for periodic transport of said gasses.

2. The method of claim 1, further comprising controlling said collection vessels and storage vessels by remote control.

3. The method of claim 2, wherein each wave power device further comprises:
    (a) a tapered channel comprising a bow end in proximity to the bow of the vessel and a stern end in proximity to the stern of the vessel, the bow end comprising an entrance below a vessel waterline so that waves approaching said bow from the sea enter the channel and rise above the waterline as the waves approach the stern end;
    (b) a valve wall affixed in proximity to the bow end of the tapered channel, said valve wall further comprising a multiplicity of check valves disposed across said valve wall, each of which permits the water breaking on said valve wall to enter a collection chamber on a side opposite the tapered channel, but prevents the water from the collection chamber from exiting through the cheek valve;
    (c) a water turbine disposed beneath the collection chamber which rotates as the water from the collection chamber exits to the sea; and
    (d) an electric generator, coupled to the water turbine.

4. The method of claim 3, further comprising the steps of:
    (a) locating a sea based central transfer station for collecting said gasses; and
    (b) pipelining of the gasses from the sea based central transfer station into a shore storage and purification facility.

5. The method of claim 4, further comprising providing means for the remote-controlled docking of any two or more of said collection vessels at sea for transferring said gasses between said collection vessels.

6. The method of claim 5, further comprising disposing of a sea anchor by one or more of the collection vessels to reduce the drift of the vessel and to maintain the vessel with its bow facing into the wind.

7. The method of claim 6, further comprising:
(a) providing a multiplicity of cables for maintaining the sea anchor in an anchoring position, and one or more retraction cables for retracting the sea anchor;
retracting the sea anchor into a storage tube; and
extracting the sea anchor from the storage tube into disposed mode.

8. The method of claim 3, wherein the gasses so produced are oxygen and hydrogen.

9. The method of claim 4, wherein the gasses so produced are oxygen and hydrogen.

10. The method of claim 5, wherein the gasses so produced are oxygen and hydrogen.

11. The method of claim 6, wherein the gasses so produced are oxygen and hydrogen.

12. The method of claim 7, wherein the gasses so produced are oxygen and hydrogen.

13. The method of claim 2, wherein the gasses so produced are oxygen and hydrogen.

* * * * *